United States Patent [19]
Brychta et al.

[11] Patent Number: 4,657,131
[45] Date of Patent: Apr. 14, 1987

[54] TENSION REGULATOR FOR A CHAIN DRIVE

[75] Inventors: Peter Brychta, Wuppertal; Klaus-Peter Wiechers, Gladbeck, both of Fed. Rep. of Germany

[73] Assignee: Bergwerksverband GmbH, Essen, Fed. Rep. of Germany

[21] Appl. No.: 703,889

[22] Filed: Feb. 21, 1985

[30] Foreign Application Priority Data

Feb. 23, 1984 [DE] Fed. Rep. of Germany ....... 3406519

[51] Int. Cl.$^4$ ............................................. B65G 43/00
[52] U.S. Cl. .................................... 198/810; 198/813; 198/856
[58] Field of Search ............... 198/810, 813, 805, 856; 226/45, 24; 340/668

[56] References Cited

U.S. PATENT DOCUMENTS

| 3,226,702 | 12/1965 | Zawels | 226/45 X |
| 3,923,151 | 12/1975 | Weber | 198/813 X |
| 3,963,115 | 6/1976 | Teske et al. | 198/813 X |
| 4,037,876 | 7/1977 | Georg et al. | 198/813 X |
| 4,167,803 | 9/1979 | Teichmann | 226/45 X |
| 4,437,619 | 3/1984 | Cary et al. | 226/45 X |
| 4,440,097 | 4/1984 | Teske | 198/810 X |
| 4,508,205 | 4/1985 | Aulagner et al. | 198/810 X |

Primary Examiner—Joseph E. Valenza
Assistant Examiner—D. Glenn Dayoan
Attorney, Agent, or Firm—Karl F. Ross; Herbert Dubno

[57] ABSTRACT

A tension regulator for a chain drive has a sensor positioned and attached adjacent the chain, preferably to chain guides for the chain which allow some free play for the chain, a logical switching unit connected to the sensor which signals when the chain configuration changes, particularly when the distance from the sensor to the chain changes, and a tension control connected to the logical switching unit. The logical switching unit signals and controls the tension control of the chain drive so that the chain tension is maintained at a preset value. Preferably the tension control comprises a telescoping cylinder about which the chain is mounted and an apparatus which extends or retracts the telescoping cylinder thus controlling chain tension. The sensor is preferably an electrical source which provides an oscillating, directed magnetic field. A plurality of these sensors may be mounted adjacent the chain to measure chain twisting, chain breaking and the relationship of individual chain strands to one another.

5 Claims, 6 Drawing Figures

TENSION REGULATOR FOR A CHAIN DRIVE

FIELD OF THE INVENTION

Our present invention relates to a tension regulator for a conveyor and especially a chain drive and, more particularly, to a tension regulator for controlling the tension in a conveyor belt or a driven chain, especially the driven chain of a flight conveyor, which has a telescoping cylinder for either the principal or auxiliary drive or both for adjusting the tension.

BACKGROUND OF THE INVENTION

Tension regulators are used for scraper, flight and excavator conveyors in mining and other heavy subterranean applications for maintaining sufficient and/or proper tension.

Supervision and control (monitoring) of chain tension is a necessity in these chain drives, since it is a system requirement that these chains extend and contract elastically or plastically during conveyor operation to a greater or lesser extent. This stretching of the chain can lead to insufficient tension and a loosened sagging chain, so that there is danger of chain jump-off from the chain drum. Besides, there is also a danger of chain flaws resulting in chain breaking by conveyor stoppage or the improper entrainment of chains by the chain feed.

With prior art chain drives it is known that the clearance of the chain from the surrounding structures of the principal or auxiliary drive will vary, depending on the tension in the chain.

A telescoping cylinder is often provided to serve as a means for changing the clearance of the chain from its surrounding structures and hence changing the chain tension. Typically the extension or retraction of the telescoping cylinder has been controlled manually and the tension adjusted by feel. Since the tension varies as a result of operating conditions during operation, however, it is often necessary to make a running adjustment of the telescoping cylinder.

Some prior art chain tension control has nevertheless been based on automatic control principles. The measured travel of a telescope cylinder or the telescope force is measured continuously and is reported to a telescope cylinder control apparatus. These measurements are then fed to a computer or a logic control apparatus which will in turn regulate a telescope position control apparatus and hence the optimal chain tension. This kind of apparatus however is comparatively expensive.

OBJECTS OF THE INVENTION

This invention has as an object a less expensive, automatic but simple, tension regulating apparatus for a chain drive or the like or other conveyor.

It is another object of this invention to provide an improved comparatively inexpensive, troublefree automatic tension regulator for a chain drive which is subject to wide variations in load during operation.

It is a further object of this invention to provide a simple automatic tension regulator for a chain drive which is also inexpensive.

SUMMARY OF THE INVENTION

These objects are attained in accordance with the invention in a conveyor which comprises an endless member passing over at least a pair of rollers, one or both of which may be driven (e.g. with a main and an auxiliary drive), the member running generally along a guide plate or bottom disposed below an upper pass and below a lower pass of the member between the rollers. A contactless proximity sensor is disposed upon one of these guides and detects the degree of sag of the member. A logic circuit is connected to the sensor, which is preferably magnetic or inductive and responds to a conductive portion of the member, and controls a fluid operated cylinder arrangement operatively coupled to the member (e.g. by being capable of shifting a roller engaged thereby) to adjust the tension.

The member can be a belt provided with metal reinforcement or a flight conveyor chain. The roller displaced by the fluid operated cylinder arrangement can be one of the rollers at the end of the conveyor which, as noted can be driven. The cylinder arrangement can be pneumatically or hydraulically operated by an appropriate servomechanism and will be referred to hereinafter as a telescoping cylinder.

The sensor can be provided at an auxiliary or a principal chain drive in which a chain can be tensioned by a telescoping cylinder, the chain preferably also passing along a guide shaped so that a sagging chain has some free play while acting to guide and retain the chain in extreme cases, the chain being driven by a chain drum or sprocket rotatably powered by a drive apparatus including the drive motor.

According to this invention the tension control is provided by attaching a sensor, preferably to a chain guide in the case of strut conveyors, adjacent the space into which the sagging chain hangs. This sensor is connected to a position adjusting controller for the telescoping cylinder or the like through an appropriately designed logic or control circuit.

In this way the shape of the hanging chain can be monitored in this sensitive region carefully and the telescoping cylinder can be used for adjustment.

The position of the chain above or below the sensor will be determined exactly mechanically or electrically and then sent into the logical switching apparatus which activates or deactivates the adjusting apparatus.

By means of the position adjusting apparatus the chain tension is raised or lowered by the corresponding motions of the telescoping cylinders. The position adjusting apparatus will be activated when the sag of the chain exceeds certain limits (defining a tolerance band) input to the logic curcuit.

However, if the chain is found within the preset limits, the position adjusting apparatus will not be activated. Alternatively, an analog response of the telescope cylinder to the sag of the chain can, in accordance with the invention, use a threshold value for the sag of the chain. This second method is found to be preferable over the two-point band system because of a smaller disturbance sensitivity.

It is particularly advantageous to provide a guide plate along which the chain passes and along which the flights can ride. The guide is trough shaped in transverse section to provide enough room for free play for the sagging or loosened chain, but also acts to guide and retain the chain in extreme cases, for example chain breaking. Both the principal and auxiliary drive ends of the conveyor can be equipped with such a guide.

The distance from sensor to chain can be measured in accordance to a preferred embodiment of this invention in which the sensor is an electromagnetic sensor generating an oscillating, directed magentic field and responding to perturbations thereof, the output of the sensor being connected to the logic circuitry which by means of the position adjusting apparatus controls the extension and retraction of the telescoping cylinder.

By a suitably bounded and unified magnetic field a spatially limited measurement results which is only effective in the vicinity of the chain. Detuning or perturbations of the magnetic field will correspond to the degree to which the chain dips or sags into the magnetic field and will measure or evaluate the mechanical state of the system, particularly the degree of chain sagging.

In start-up of this kind of chain drive it is advantageous if the chain is loaded so as to have a suitable tension corresponding to the loading before standstill. In order to achieve this, it is provided according to this invention further that the logical switching unit is directly connected to the control of the drive unit of the chain drive. In this way, at the beginning of start-up, if the value of the chain tension is measured to be high or low the logic unit or circuit will be activated so that the appropriate value of start-up tension will be obtained.

Variation of the chain geometry, chain tearing and similar damages to the chain strands can be ascertained as well as the measurement of the tension force by the present invention. A sensor can be assigned to each of the chain stretches and/or the flights and may be positioned on the guide plates or the supporting structures.

With the number and arrangement of the sensors at the control of the manufacturer or the operator, it is further possible to provide a diagnostic system, for example, for the flight chain or scraper conveyor apparatus, and to set up connections for collecting further operating data such as motor performance or the like, in order to detect detrimental operating conditions fast enough to prevent significant damage. Several sensors instead of a single sensor may be positioned and distributed along the length of the guide or other supporting structures of a chain drive to accomplish this.

Also in a rubber belt conveyor having steel fabric belts or reinforcements, the invention can be effectively practiced by positioning electromagnetic sensors having an oscillating, directed magneted field to detect sag of the band. These sensors by way of a logical switching unit control the position adjusting apparatus of a tension controlling aggregate. This tension controlling aggregate can provide an alternative to the telescoping cylinder and its position adjustment apparatus described above.

This invention represents a significant technological advance in the automatic control or adjustment of the tension force of the described conveyors. The tension force is monitored continuously via the sensor and the logic or control system responsive thereto, whereby the position control member is retracted, extended or left in position.

At the same time further functions and tasks can be fulfilled with the inventive sensors, for example, the scraper distances from one another can be monitored. Besides, with the help of the sensor the spacings of the chain or flight members from one another can be monitored.

Also the invention provides an easy and reliable diagnostic system with a number of sensors organized together into a network which monitors the configuration of the entire chain. Thus in coal-planing or excavating conveyors, for example, with the help of the kind of sensor described above, whether the chain is twisted or not or where a given planing tool or cutter is located.

When a planing conveyor has its guide plates provided with corresponding sensors distributed over the length of the guides, a broken or torn chain can be detected and the location of the hanging chain can be established immediately and will therefore considerably shorten the repair time. With roller loaders the roller bearings can be precisely controlled by similar clearance measurements, for example, for chain conveyors or their ramps. In roller loaders with drive shafts sensors can be positioned on the roller loaders over the drive shaft to sense spacing errors and so to timely providing information which can be used to prevent operation damage. Finally, it is even possible to monitor continuously corrosion and damage in a conveyor belt with steel reinforcements.

BRIEF DESCRIPTION OF THE DRAWING

The above and other objects, features and advantages of our invention will become more readily apparent from the following detailed description with reference to the accompanying diagrammatic drawing in which.

SPECIFIC DESCRIPTION

Figure 1:
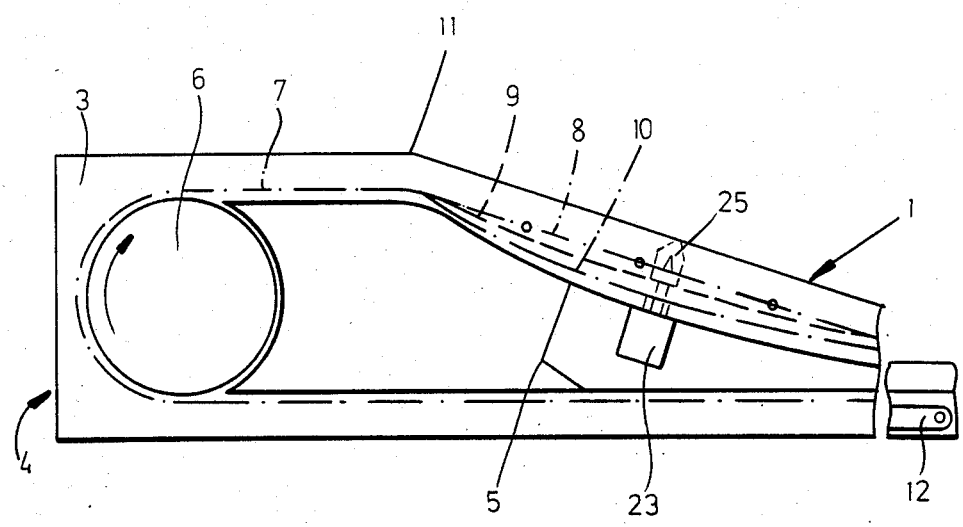
FIG. 1 is a side view of a chain tension regulator according to our invention controlling an auxiliary drive at one end of a flight conveyor.

In FIG. 1 an auxilariy drive 4 is shown to be provided in an apparatus frame 3 which can be moved relative to the balance of the conveyor assembly by a telescoping cylinder arrangement 12.

The guide 5 of the auxiliary drive 4 is shaped so as to be concave adjacent the running chain 7 on the chain payout edge 11 of the apparatus frame 3. The chain 7 runs by the guide 5 with sufficient clearance so as to provide some free play for the sagging chain but yet the guide is close enough to the chain to provide some restraint and guidance.

The chain 7 runs by a single sensor 23 in this embodiment positioned on the guide 5 at a location along the trough-shaped guide where changes in chain sagging can be easily measured.

The chain configuration indicated by continuous line 8 corresponds to comparatively high tension, the configuration of the short-dashed line 9 corresponds to normal tension and the low tension or excessively sagging chain is shown by long-dashed lines 10 in FIG. 1. The sensor 23 is a magnetic sensor having a directed and confined oscillating magnetic field shown in dotted lines at 25 in FIG. 1.

Figure 3:
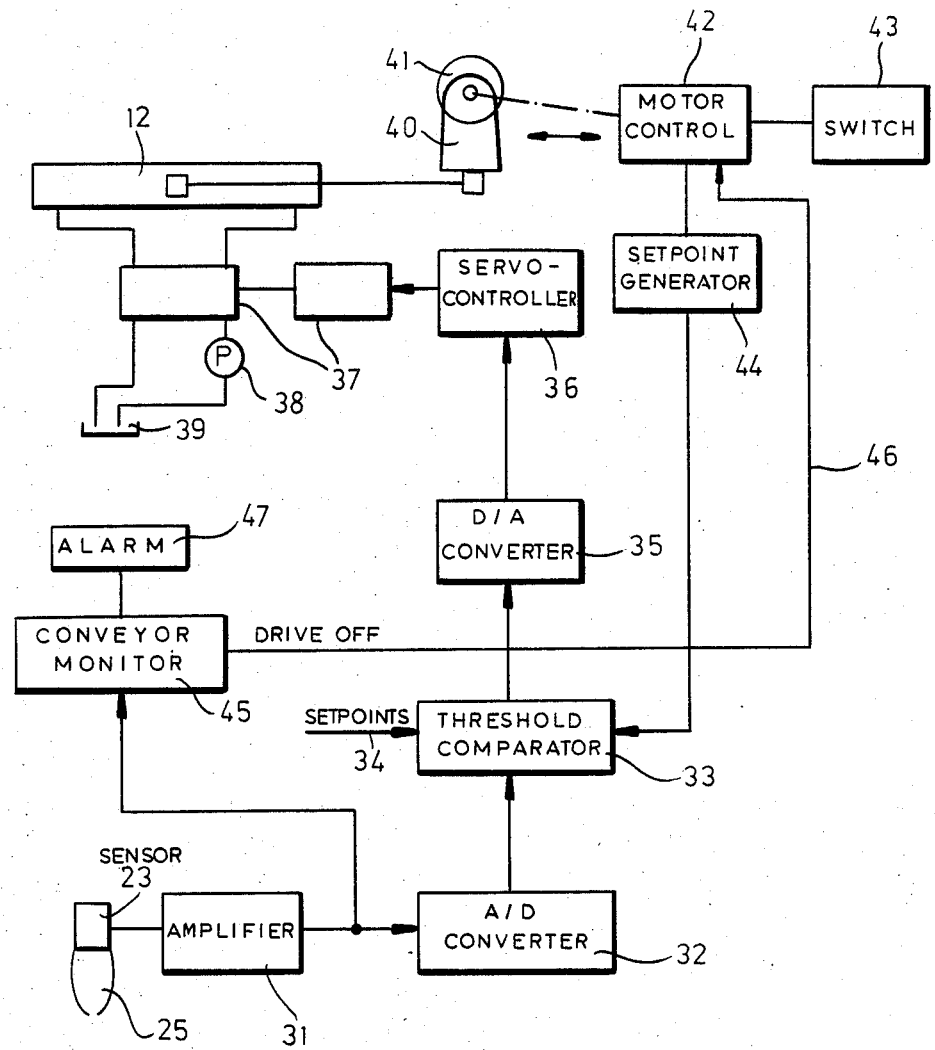
FIG. 3 is a block diagram showing the electronic control components and their interrelation in the preferred embodiment of this invention.

As seen from FIGS. 1 and 3 the variable spacing of the chain 7 from the sensor 23 by the magnetic field 25 whose perturbations are detected and amplified at 31. The output of the amplifier 31 is fed to an analog-digital converter 32 whose output was applied to a threshold comparator 33. A setpoint input 34 can establish the switching thresholds of the logic circuitry and upon deviation from the tolerable deviation of the sag from the band defined by the thresholds, a signal is transmitted to the digital-analog converter 35 operating the servocontroller 36 for the electrically operated valve 37 connecting the cylinder unit to a pump 38 and a reservoir 39. As illustrated the cylinder unit 12 acts on the support 40 of a roller, sprocket or drum 41 forming the respective drive so that the chain (or belt) is tensioned or relieved to maintain the tension represented by the line 9. The member 41 is operated by a motor (not shown) via a motor control 42 started by a switch 43.

When the switch 43 is actuated a setpoint generator 44 is triggered to apply the setpoint to the comparator 33 as the starting tension input. The regular setpoints thereafter come into play for continued operation.

The sensors (e.g. sensor 23) also provide an input to a microprocessor based monitor of conveyor function as described above. In the event of a failure or defect, the monitor 45 can initiate a drive cutoff signal 46 and trigger an alarm 47.

Figure 2:
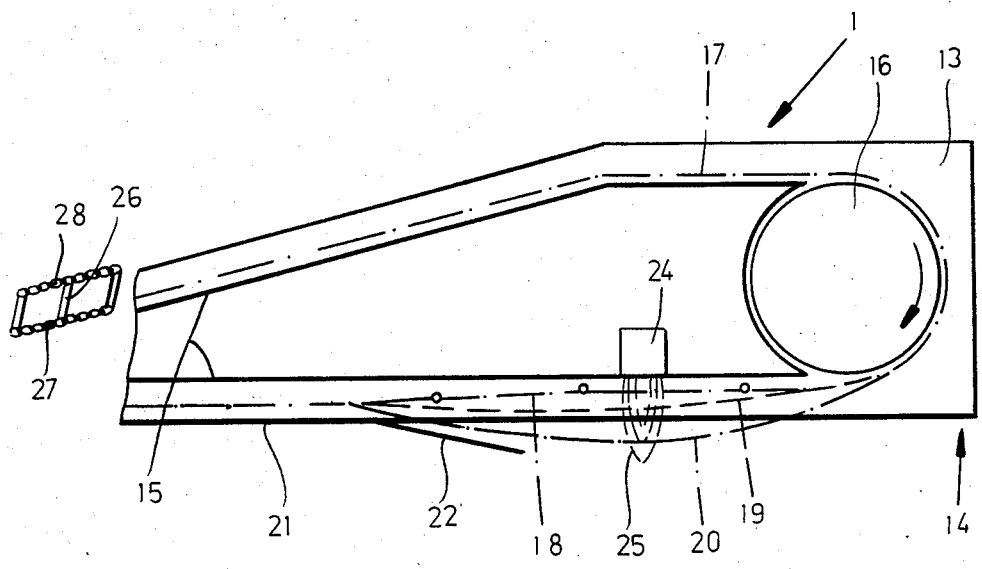
FIG. 2 is a side view of tension regulator controlling a principal drive of the same conveyor at the other end thereof.

FIG. 2 shows an apparatus frame 13 with the principal drive 14 mounted thereon. Here the guide 15 attached to the apparatus frame 13 is shaped along its lower payout side 21 to provide the chain 17 with some free play. A stop support 22 is attached to guide plate 21 to limit chain 17 in its sagging configuration 20.

Via the sensor 24 and its magnetic field 25 we determine as above the degree of sagging of chain 17 and whether the chain 17 is in high tension configuration 18, intermediate configuration 19, or the sagging configuration 20. For example, if the chain 17 sags out of the magnetic field 25, then the sensor 24 signals the control circuit 31-35 of FIG. 3 which activates the position adjusting apparatus 36-39 to extend the corresponding telescoping cylinder not shown in FIG. 2, thus adjusting the tension to the intermediate value again.

Advantageously to insure the correct chain tension at start-up the logical switching unit 31 is directly connected to the controller 33 for the chain drive drum 6 or 16. The drive switch 34 must signal the logical switch unit 31 at start-up. At this time the appropriate preset limit for the start-up tension is compared to the tension measured by the sensor 23 and the control apparatus adjusts the telescoping cylinder accordingly.

Figure 4:
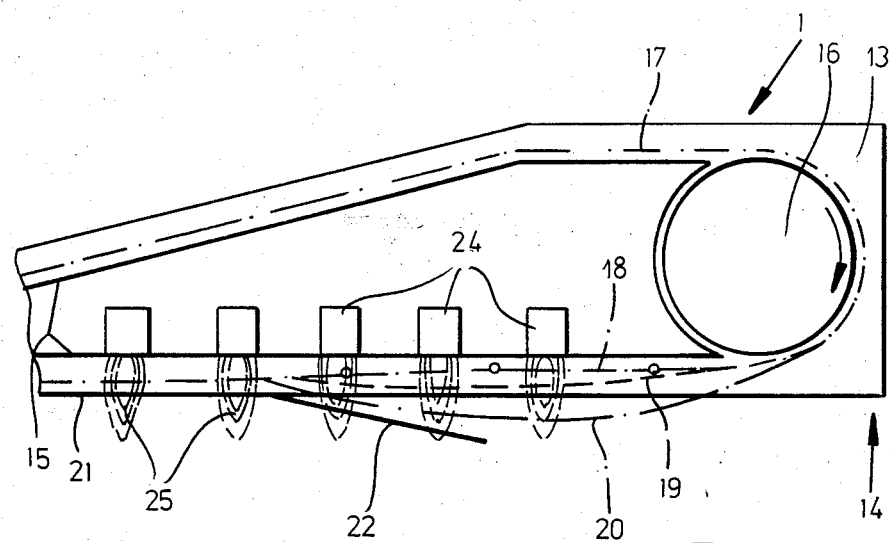
FIG. 4 is a view similar to FIG. 2 of an embodiment using more than one sensor.

For determining the state of the chain 7 or 17 more completely including measurement of the relation of individual chain strands to one another, several sensors 23 or 24 are distributed over the length and breadth of the chain drive. A typical configuration is shown for the principal drive 14 shown in FIG. 4 with several sensors 24 attached to the guide 15. Furthermore these kinds of sensors can also be assigned to the flights 26 and each of the chain strands 27 and/or 28. The more sophisticated electronic control network 45 however is able to sort out the information from a plurality of sensors and to control the device on that basis.

Figure 5:
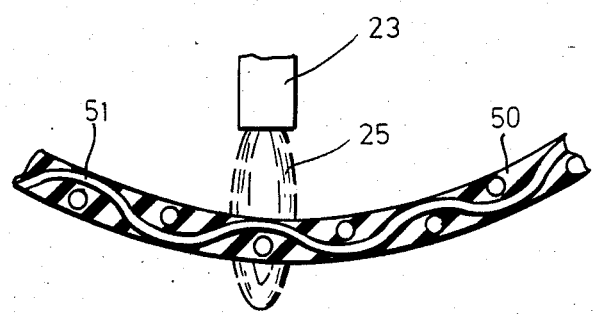
FIG. 5 is a diagram illustrating another aspect of the invention.
Figure 6:
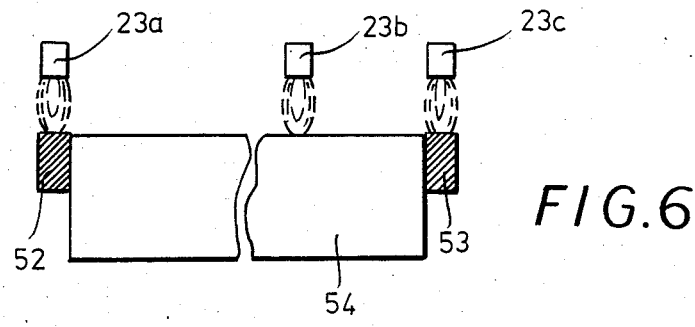
FIG. 6 is a transverse section through a flight conveyor showing a plurality of sensors.

FIG. 5 shows that the magnetic field 25 from the sensor 23 can also respond to the sag of a rubber conveyor belt 50 containing a metal inlay 51 or some other metal reinforcement. The control circuit is similar to that of FIG. 3 and the monitor 45 can also respond to the integrity of the metal inlay 51. From FIG. 6 it can be seen that the sensors 23a, 23b and 23c can respond to the passage of the chains 52 and 53 along the sides of the conveyor as well as to the passage of the flights 54.

We claim:
1. A tension regulating apparatus for a chain drive for a subterranean mining machine, comprising:
a chain driven by said drive;
a telescoping cylinder acting upon said chain to regulate the tension thereof;
a contactless sensor positioned adjacent to said chain and to said chain drive, said sensor being attached to a supporting structure of said chain drive, said sensor being disposed so as to effectively measure changes in sag resulting in changes in a space between said sensor and said chain;
a logic circuit connected to said sensor for processing signals therefrom; and
a tension controlling unit for mechanically changing chain tension connected to said logic circuit acting upon said cylinder for automatically increasing tension on said chain during operation when said chain sags excessively and decreasing said tension when said chain is too taut, a plurality of such sensors being distributed and positioned along the length of said chain of said chain drive to monitor the configuration of the sag of said chain, said sensor is an electromagnetic sensor having oscillating, directed magnetic field.

2. A tension regulating apparatus for a chain drive according to claim 1 wherein said logic circuit is also connected to a drive controller of the drive unit of said chain drive so as to adjust said tension of said chain at start-up to a present value.

3. A tension regulating apparatus according to claim 1 wherein one of said sensors is assigned to each of two chain strands forming the chain so as to monitor chain breaking and twisting.

4. A tension regulating apparatus according to claim 1 wherein said tension controlling unit comprises a telescoping cylinder attached to said chain so as to increase chain tension when extended and to decrease chain tension when retracted and a position adjusting device attached to said telescoping cylinder and connected to said logic circuit so as to be able to increase and decrease the tension on said chain according to signals from said sensors and said logic circuit.

5. A tension regulating apparatus for a chain drive according to claim 4 wherein said sensors are attached to and supported by a chain guide and said guide is trough shaped to conform to the hanging chain so as to provide sufficient room for chain free play while providing some guidance for chain motion.

* * * * *